US011144589B2

(12) United States Patent
Doh (10) Patent No.: US 11,144,589 B2
(45) Date of Patent: Oct. 12, 2021

(54) OBJECT SEARCH SERVER, SYSTEM HAVING SAME AND USED TO SEARCH FOR OBJECT BASED ON COLOR-SENTIMENT, AND METHOD THEREOF

(71) Applicant: Mycelebs Co., Ltd., Seoul (KR)

(72) Inventor: Jun Woong Doh, Seoul (KR)

(73) Assignee: MYCELEBS CO., LTD., Seoul (KR)

( * ) Notice: Subject to any disclaimer, the term of this patent is extended or adjusted under 35 U.S.C. 154(b) by 739 days.

(21) Appl. No.: 15/933,712

(22) Filed: Mar. 23, 2018

(65) Prior Publication Data

US 2018/0285356 A1 Oct. 4, 2018

(30) Foreign Application Priority Data

Mar. 28, 2017 (KR) .................. 10-2017-0039316

(51) Int. Cl.
*G06K 9/00* (2006.01)
*G06T 7/90* (2017.01)
*G06F 16/583* (2019.01)
*G06F 16/532* (2019.01)
(Continued)

(52) U.S. Cl.
CPC ........ *G06F 16/5838* (2019.01); *G06F 16/532* (2019.01); *G06F 16/5866* (2019.01); *G06K 9/00624* (2013.01); *G06K 9/4652* (2013.01); *G06T 7/90* (2017.01)

(58) Field of Classification Search
CPC .............. G06F 16/5838; G06F 16/532; G06F 16/5866; G06F 16/43; G06F 16/903; G06F 16/785; G06K 9/00624; G06K 9/4652; G06T 7/90
See application file for complete search history.

(56) References Cited

U.S. PATENT DOCUMENTS 7,689,624 B2 * 3/2010 Huang ................ G06F 16/9535
707/760
2007/0061759 A1 * 3/2007 Klein, Jr. .............. G06F 16/637
715/853
(Continued)

FOREIGN PATENT DOCUMENTS

JP 2016091522 A 5/2016
KR 20070009833 A 1/2007
KR 100851422 B1 8/2008

OTHER PUBLICATIONS

Korean Office Action for Korean Application No. 1020170012871 dated Mar. 31, 2018.
(Continued)

*Primary Examiner* — Shefali D Goradia
(74) *Attorney, Agent, or Firm* — Fay Sharpe LLP (57) ABSTRACT

Disclosed is a system for searching for an object based on color-sentiment, and a method thereof. The system for searching for an object based on color-sentiment includes: a search requestor terminal inputting, by a search requestor, at least one color of multiple colors to search for an object, and receiving multiple object search results based on sentiment information matched with the color; and an object search server transmitting, to the search requestor terminal, the multiple object search results based on an object search information database storing the sentiment information matched with the color.

10 Claims, 7 Drawing Sheets

(51) Int. Cl.
*G06F 16/58* (2019.01)
*G06K 9/46* (2006.01)

(56) References Cited

U.S. PATENT DOCUMENTS

| | | | | |
|---|---|---|---|---|
| 2013/0198180 A1* | 8/2013 | Channing | ............. | G06F 16/901 |
| | | | | 707/736 |
| 2014/0046934 A1* | 2/2014 | Zhou | ................. | G06F 16/24526 |
| | | | | 707/723 |
| 2016/0070790 A1* | 3/2016 | Bhat | ................. | G06F 16/90324 |
| | | | | 707/722 |

OTHER PUBLICATIONS

K. Hachimura, Retrieval of Paintings Using Principal Color Information, Proc. of ICPR '96, IEEE, 1996, pp. 130-134, Ritsumeikan University, Shiga, Japan.

* cited by examiner

OBJECT SEARCH SERVER, SYSTEM HAVING SAME AND USED TO SEARCH FOR OBJECT BASED ON COLOR-SENTIMENT, AND METHOD THEREOF

CROSS REFERENCE TO RELATED APPLICATION

The present application claims priority to Korean Patent Application No. 10-2017-0039316, filed Mar. 28, 2017, the entire contents of which is incorporated herein for all purposes by this reference.

BACKGROUND OF THE INVENTION

Field of the Invention

The present invention relates generally to an invention capable of searching for an object, such as an art work, a photo, a painting, etc. More particularly, the present invention relates to a system for searching for an object according to a sentiment that a user currently has, based on sentiments associated with colors or using sentiments associated with colors, and a method thereof.

Description of the Related Art

In the current society, with development of the Internet, various pieces of information may be viewed, and the individual may directly search a search system for desired information to read.

When a user inputs a search word corresponding to a search object to the search system, the search system provides the user with an object, such as, a book, a video, a photo, an art work, etc., related to the input search word.

However, in this search method, only the keyword input by the user is searched for. Thus, when the user does not remember the keyword, the user is unable to obtain the object desired to be found.

That is, the user needs to know exactly the name or title of the object, such as a book, a video, an art work, etc., and the keyword related to the object so as to obtain the desired object.

In the meantime, recently, a system has been developed that when at least one of a desired color and a color keyword is input, an object, such as an image, and a photo, containing the desired color components substantially is searched for. However, since the system uses only the color component data of the object, the system searches for the object containing the color components substantially, but has a limitation in stimulating the user sentiment.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a user with an a sentiment element of a color when the user simply selects the color preferred, and simultaneously to provide the user with an object most suitable to the user sentiment according to the latest trends as well as a wide range of objects.

In order to achieve the above object, according to one aspect of the present invention, there is provided an object search server for searching for an object based on a color-sentiment, the server configured to: receive, from a search requestor terminal, at least one color of multiple colors input to the search requestor terminal; and transmit, to the search requestor terminal, multiple object search results based on an object search information database storing sentiment information matched with the color.

The object search information database of the object search server may include: a color-sentiment information database storing at least one piece of sentiment information capable of being matched with the color; and an object information database storing information related to the object. The object search server may include: a color-sentiment information management unit matching the color with the sentiment information stored in the color-sentiment information database; and an object extraction management unit matching, based on public information, which is published on the Internet, on a sentiment that people have after viewing the object, object information stored in the object information database with the sentiment information managed by the color-sentiment information management unit, and providing the sentiment information and the object information matched with each other to the search requestor terminal.

The object extraction management unit may update the public information on the sentiment in real time, or periodically.

The color-sentiment information management unit may assign scores to the sentiment information and the color for each sentiment and for each color, respectively.

The sentiment information and the object information matched with each other may be listed in order according to a combination of a score of the sentiment information for each sentiment and a score of the color for each color.

The sentiment information may include at least one of an expression, a sentiment word, a gesture, a sound, and an emoticon.

Among the multiple object search results transmitted to the search requestor terminal, when a desired object is received from the search requestor terminal, the object extraction management unit may search the object information database and may transmit information related to the desired object to the search requestor terminal.

The information related to the desired object may include at least one of an image of the object, a title or name of the object, an original title, a maker, a production period, an era, a type, a technique, a size, and a possessive place.

According to another aspect, there is provided an object search method of searching for an object based on a color-sentiment by an object search server, the method including: receiving, from a search requestor terminal, at least one color of multiple colors input to the search requestor terminal; and transmitting, to the search requestor terminal, multiple object search results based on an object search information database storing sentiment information matched with the color.

The object search method may further include: receiving, from the search requestor terminal, a desired object among multiple object search results transmitted to the search requestor terminal; and searching the object search information database, and transmitting information related to the desired object to the search requestor terminal.

According to another aspect, there is provided a color-sentiment based search system including: a search requestor terminal configured to input, by a search requestor, at least one color of multiple colors to search for an object, and receive multiple object search results based on sentiment information matched with the color; an object search server configured to transmit, to the search requestor terminal, the multiple object search results based on an object search information database storing the sentiment information matched with the color; and a network configured to connect the search requestor terminal and the object search server in a wired or wireless manner.

Among the multiple object search results transmitted to the search requestor terminal, when the search requestor inputs a desired object, the object search server may search the object search information database and may transmit information related to the desired object input by the search requestor to the search requestor terminal.

According to another aspect, there is provided a color-sentiment based search method conducted by a color-sentiment based search system including: a search requestor terminal; an object search server having an object search information database; and a network connecting the search requestor terminal and the object search server in a communication manner, the method including: inputting, by a search requestor, at least one color of multiple colors via the search requestor terminal; matching, by the object search server, the input color with sentiment information in the object search information database; matching, by the object search server, based on public information, which is published on the Internet, on a sentiment that people have after viewing an object, the sentiment information with object information in the object search information database; and transmitting, by the object search server, the sentiment information and the object information matched with each other to the search requestor terminal.

The color-sentiment based search method may further include: inputting, by the search requestor, a desired object of the object information transmitted to the search requestor terminal; and searching, by the object search server, the object search information database and transmitting information related to the desired object input by the search requestor to the search requestor terminal.

The features and advantages of the present invention will be more clearly understood from the following detailed description when taken in conjunction with the accompanying drawings.

Prior to the description, all terms or words used herein should not be interpreted as being limited merely to common and dictionary meanings but should be interpreted as having meanings and concepts which are defined within the technical scope of the present invention.

According to the present invention, when the user simply selects a preferred color, the user may simultaneously obtain a sentiment element of the color and an object most suitable to the user sentiment according to the latest trends, as well as a wide range of objects.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The above objects, specific advantages, and other features of the present invention will be more clearly understood from the following detailed description taken in conjunction with the accompanying drawings.

As for reference numerals associated with elements in the drawings, the same reference numerals will refer to the same elements through the drawings.

Further, it will be understood that, although the terms "first", "second", etc. may be used herein to distinguish one element from another element, these elements should not be limited by these term.

Hereinbelow, in the description of the present invention, when it is determined that the detailed description of the known art related to the present invention might obscure the gist of the present invention, the detailed description thereof will be omitted.

Now, exemplary embodiments of the present invention will be described in detail with reference to the accompanying drawings.

Figure 1:
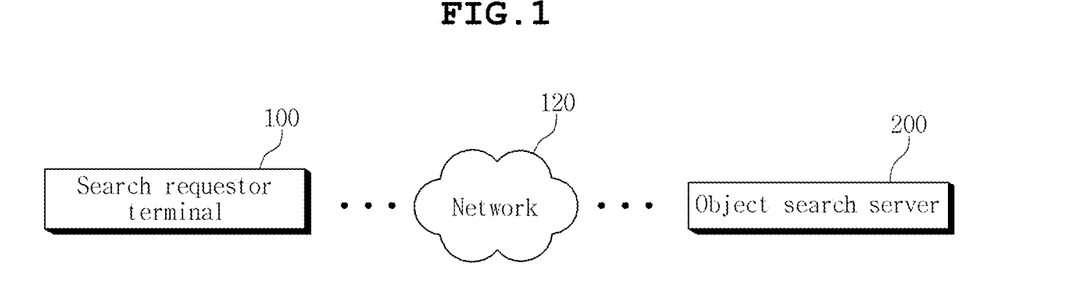
FIG. 1 is a view illustrating a color-sentiment based system according to the present invention.

FIG. 1 is a view illustrating a color-sentiment based system according to the present invention. The color-sentiment based system includes a search requestor terminal 100, an object search server 200, and a network 120 connecting the search requestor terminal and the object search server in a wired or wireless manner.

The search requestor terminal 100 is a device used when a search requestor wants to search for a desired object, such as a book, a video, a photo, an art work, etc. Via the search requestor terminal 100, the search requestor inputs one of multiple colors to search for the object, and receives multiple object search results based on sentiment information matched with the colors. Here, the sentiment information means a means of expressing a sentiment that a person has, such as at least one of person's expression, a sentiment word, a gesture, a sound, and an emoticon. For understanding, in the description, what may reveal sentiment information best, i.e. a sentiment word will be mainly described.

Thus, the search requestor terminal 100 may provide the search requestor with a color-sentiment selection part 320 for inputting a color, such as the orange color via a display part (e.g., 310 in FIGS. 3A and 3B) of the terminal. The color-sentiment selection part 320 is provided as a circular color distribution chart in FIGS. 3A and 4B, but it is only an example, and it may be designed in the arbitrary form, such as the form of a bar, keyword input, a color table, etc.

The search requestor terminal 100 may include a computer, a smart phone, a digital broadcasting device, etc. equipped with a processor performing the above-described functions; a power source driving the processor; a transmission/reception unit transmitting/receiving data to/from another device or apparatus via the network 120; and a memory storing different types of data, but the search requestor terminal 100 is not limited thereto.

Figure 2:
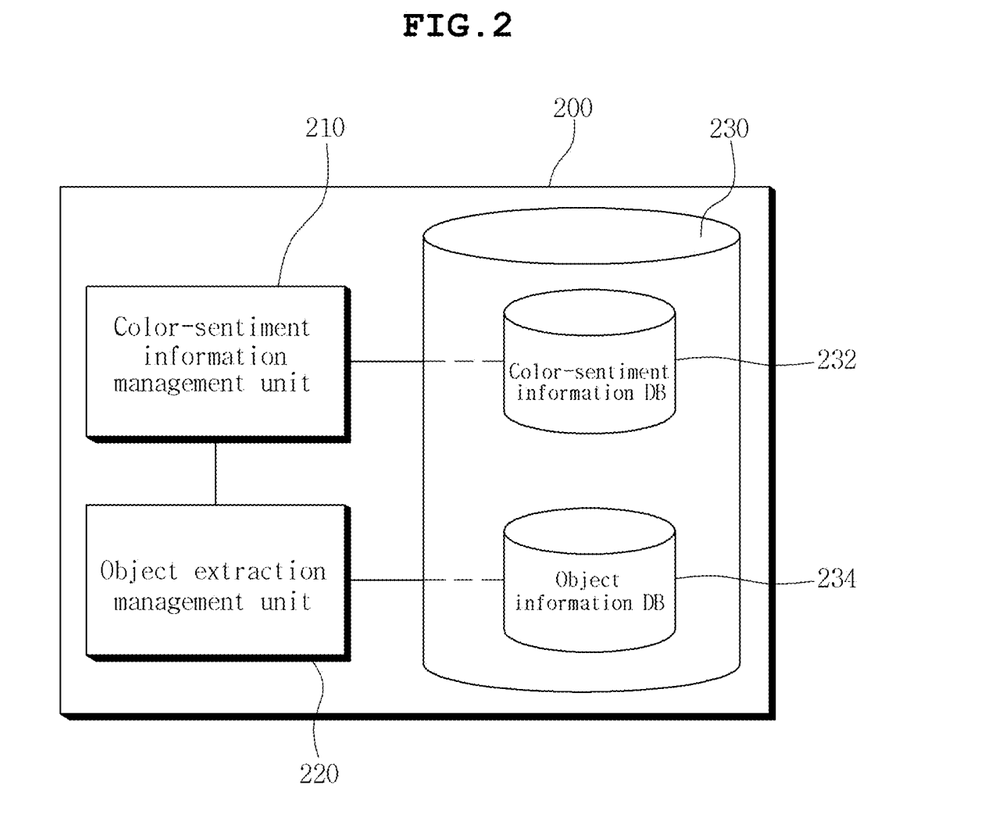
FIG. 2 is a view illustrating an object search server of a color-sentiment based system according to the present invention.

The object search server 200 conducting data communication with the search requestor terminal 100 includes, as shown in FIG. 2, a color-sentiment information management unit 210; an object extraction management unit 220; and an object search information database DB 230 connected to the management units.

The object search information database DB 230 particularly includes: a color-sentiment information database 232 connected to the color-sentiment information management unit 210; and an object information database 234 connected to the object extraction management unit 220.

The color-sentiment information database 232 may store at least one piece of sentiment information, e.g. a sentiment word, etc. that may be matched with the color input from the search requestor. Likewise, the object information database 234 may store object information which is information defining an object, such as a video, an art work, an image, a photo, etc.; and information related to the object, the information being relevant to the object information. For example, the information related to the object may be at least one of an image of the object, the title or name of the object, the original title, the maker, the production period, the era, the type, the technique, the size, and the possessive place.

The color-sentiment information management unit 210 connected to the color-sentiment information database 232 is configured to match the sentiment information stored in the color-sentiment information database 232 with the color input from the search requestor. Also, the color-sentiment information management unit 210 assigns a score to the sentiment information for each sentiment so as to classify and manage sentiment information according to a score.

Particularly, the color-sentiment information management unit 210 may assign a sentiment score of the color to each sentiment word stored in the color-sentiment information database 232.

For example, the sentiment that a person has for the orange color may be expressed in the sentiment word generally, such as "eco-friendly, retro, and heavy" (hereinafter, referred to as "a first sentiment word"), "romantic, sophisticated, and pure" (hereinafter, referred to as "a second sentiment word"), "masculine, citified, and pretty" (hereinafter, referred to as "a third sentiment word"), etc. Here, the color-sentiment information management unit 210 may assign weightings or scores to the first, second, and third sentiment words in the color-sentiment information database 232. Via the color-sentiment information management unit 210, the sentiment words are classified and managed in the order of occurring to a person when thinking of the orange color, such as in the order of the first sentiment word with the highest score, the second sentiment word with the second highest score, and the third sentiment word with the lowest score.

Further, in addition to assign sentiment scores to the sentiment words stored in the color-sentiment information database 232, when the search requestor inputs multiple colors to the search requestor terminal, the color-sentiment information management unit 210 may manage colors by assigning scores to the colors to determine the priorities of the colors. In other words, the color-sentiment information management unit 210 is configured to determine multiple object search rankings according to a combination of a score assigned to the sentiment information for each sentiment and a score assigned to the color for each color.

Based on public information, which is published on the Internet, on the sentiment that people have after viewing the object, the object extraction management unit 220 connected to the object information database 234 is configured to match the object information in the object information database 234 with the sentiment information, such as the first to third sentiment words, managed by the color-sentiment information management unit 210, and provide the matched sentiment information and object information to the search requestor terminal.

In other words, the object extraction management unit 220 may simply match the object information in the object information database 234, such as an art work, a video, a photo, with the first to third sentiment words, and may match, depending on a general sentiment of people using the Internet who have viewed a current object and have had, the first to third sentiment words with a suitable object.

For example, when the public views the art work "Soaring" created by "Kwon Ki Soo", the art work is generally expressed in the third sentiment word (i.e., "masculine, citified, and pretty"). However, when the art work appears in a movie set in 2005, the public who have seen the movie may find that the art work is better to be expressed in the first sentiment word ("eco-friendly, retro, and heavy") rather than in the third sentiment word, and may use words similar to the first sentiment word on a social networking service (SNS), etc. Thus, the object extraction management unit 220 matches the object, i.e. the "Soaring", which is previously matched to the third sentiment word, to the first sentiment word rather than to the third sentiment word no more, and displays the art work "Soaring" with the first sentiment word on the display part 310 of the search requestor terminal 100 (referring to the art work 1 in FIG. 3B).

Consequently, using the latest trends on SNS, such as the public information, etc., the object extraction management unit 220 enables the search requestor to find an art work most suitable to the impression of the current color orange. For example, when the economy is booming, the object extraction management unit 220 may update the reaction of the public in real time. When the economy is in recession, the reaction of the public may be periodically updated over a period of time.

Figure 3A:
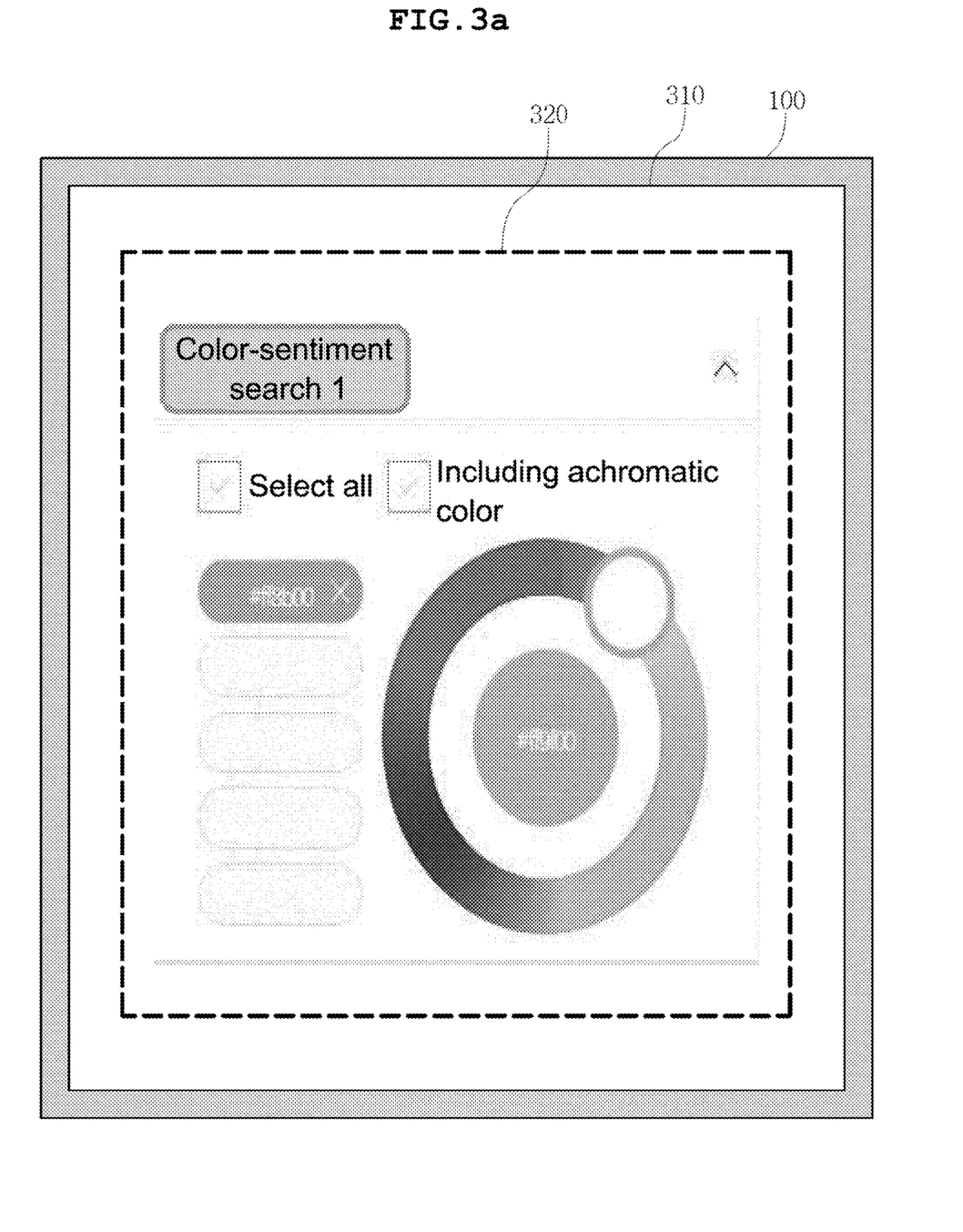
FIG. 3A is a view illustrating an example where a search requestor selects one color from a color-sentiment selection part displayed on a display part of a search requestor terminal according to the present invention.
Figure 3B:
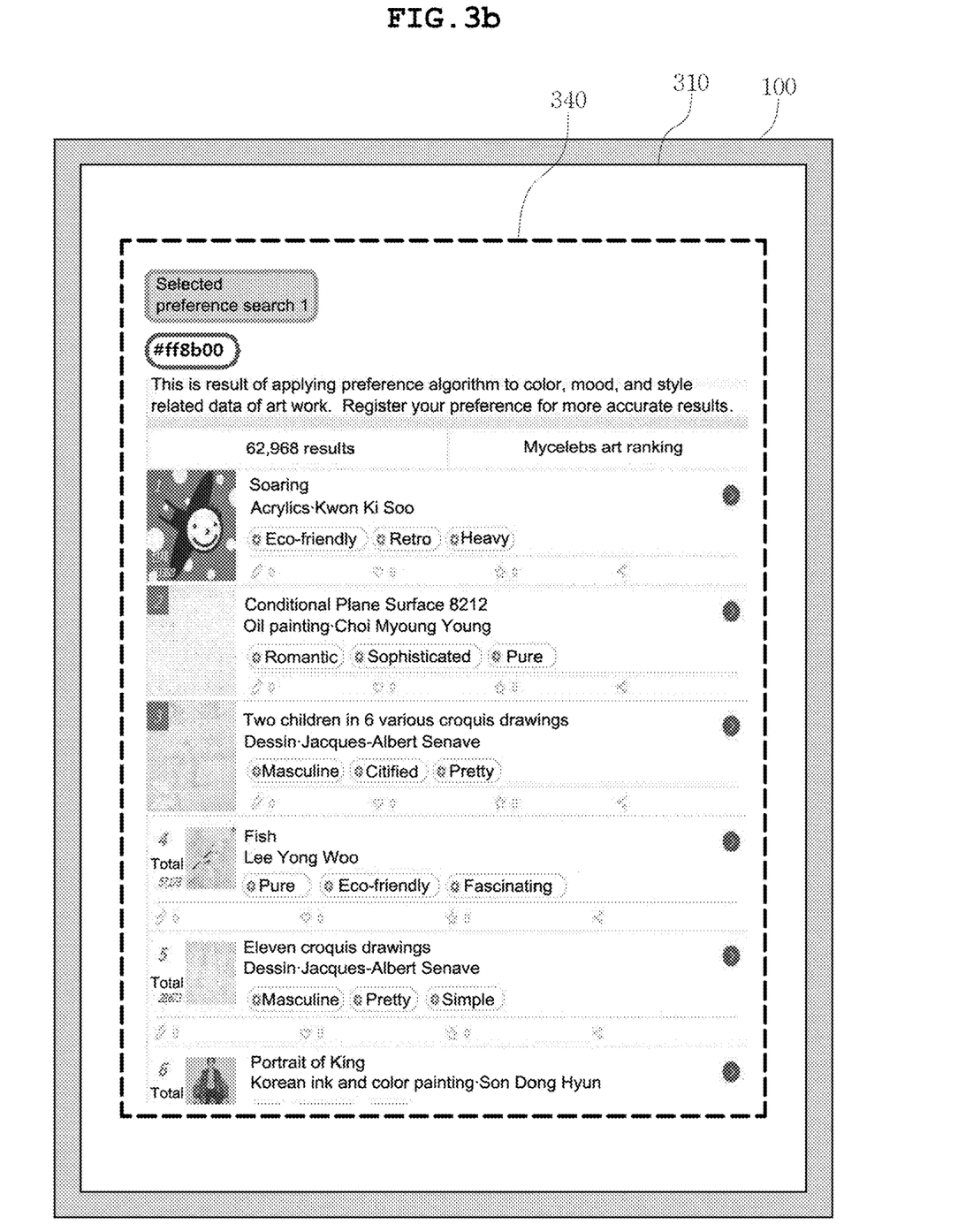
FIG. 3B is a view illustrating an example where due to color-sentiment selection in FIG. 3A, with sentiment information, e.g. a sentiment word, of the color, an object matched with the sentiment word is displayed on the display part of the search requestor terminal.

As described above, FIG. 3A is a view illustrating an example where the search requestor inputs "the orange color" as a color-sentiment search. FIG. 3B is a view illustrating an example showing the first sentiment word (i.e., "eco-friendly, retro, and heavy") that best suits "the orange color" and the art work "Soaring" that suits the first sentiment word.

Likewise, as shown in FIG. 3B, the object search server 200 lists multiple search results 340 according to the color input from the search requestor, specifically, lists the art work "Soaring", an art work suitable to the second sentiment word ("romantic, sophisticated, and pure"), an art work suitable to the third sentiment word ("masculine, citified, and pretty"), etc. in order in the form of a list, whereby listed art works are provided to the search requestor terminal 100.

Figure 4A:
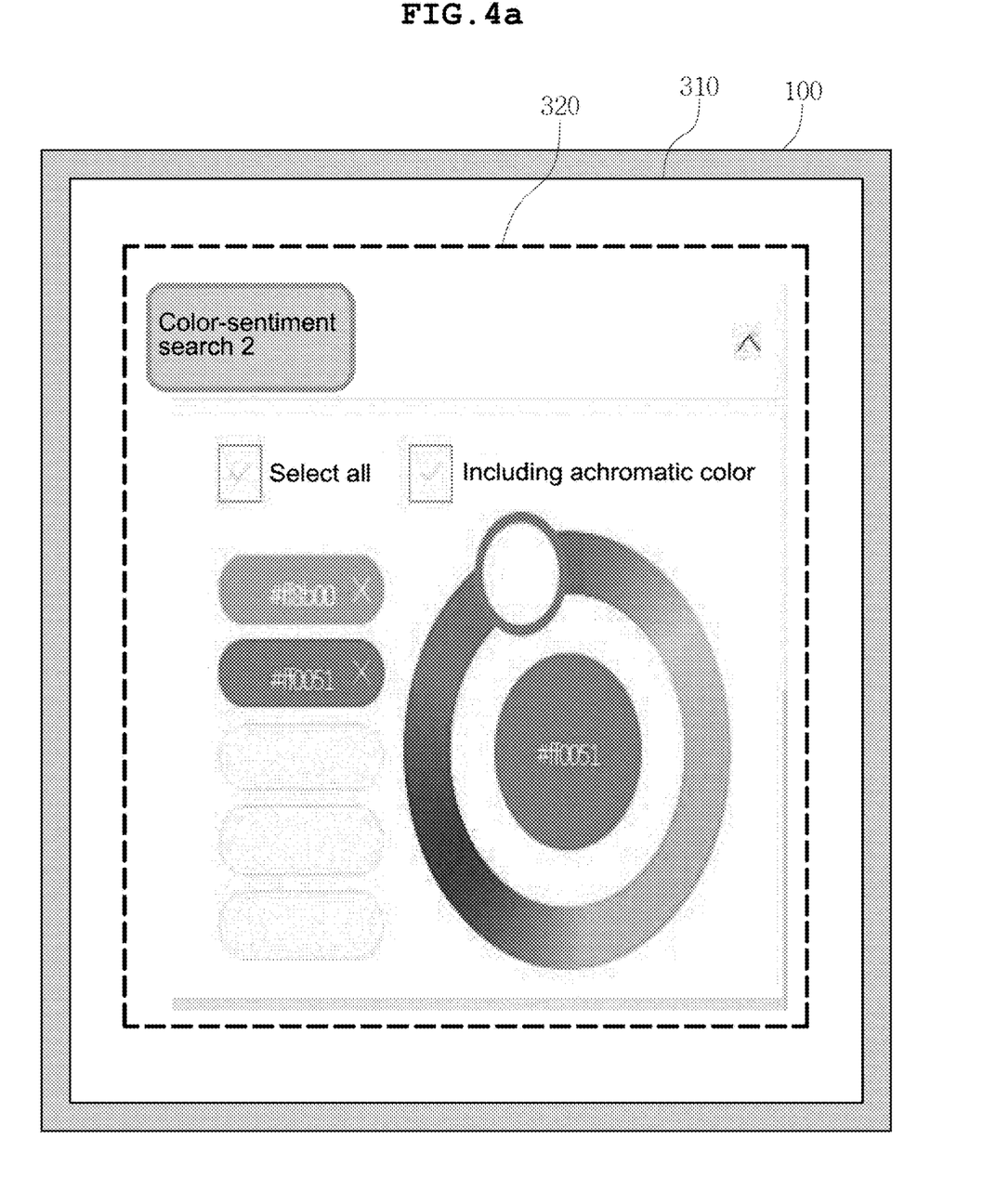
FIG. 4A is a view illustrating an example where the search requestor selects another color from the color-sentiment selection part displayed on the display part of the search requestor terminal according to the present invention.

In the meantime, as shown in FIG. 4A, the search requestor may input, in addition to the orange color, another color, such as the red color via the search requestor terminal.

Figure 4B:
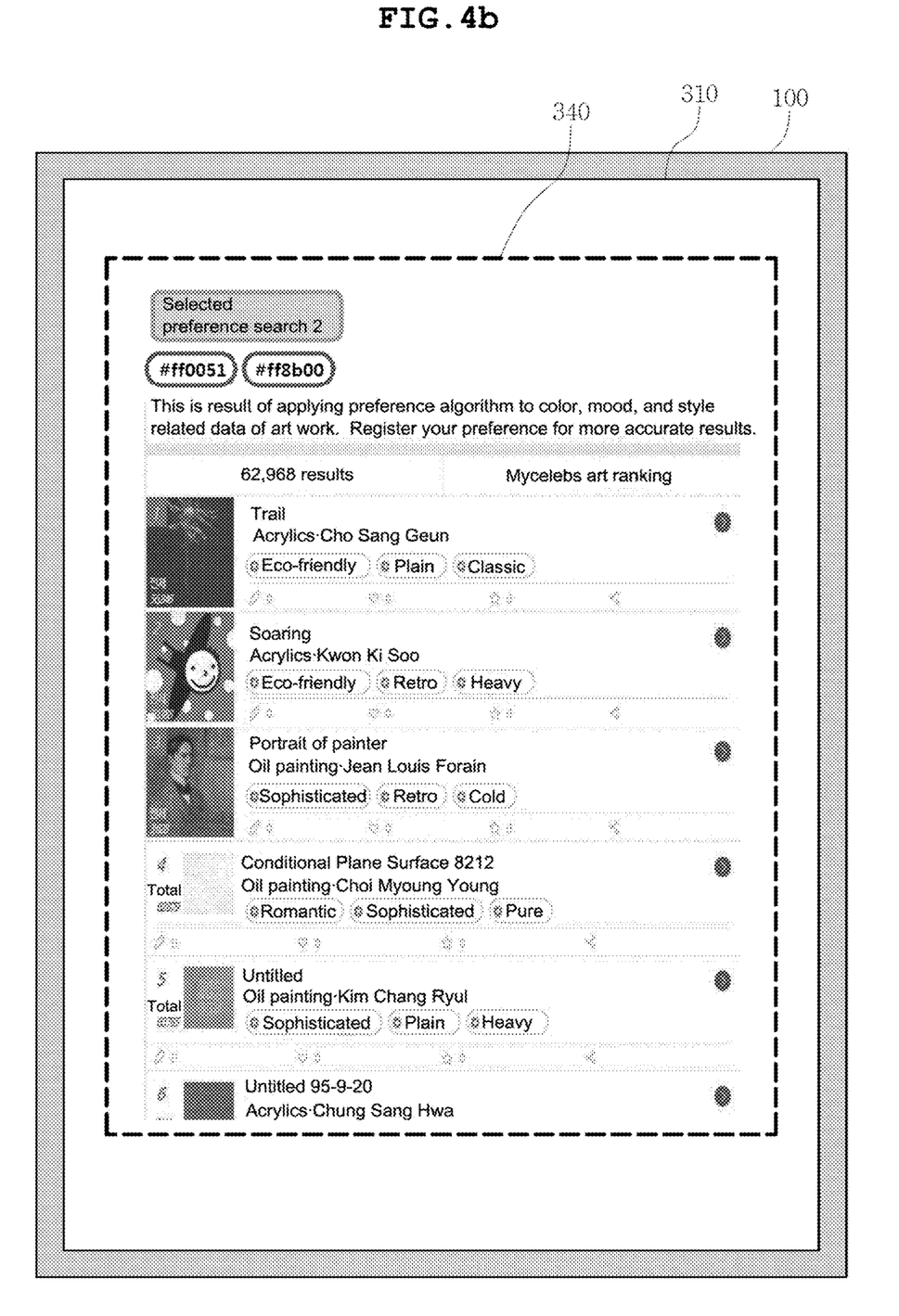
FIG. 4B is a view illustrating an example where due to color-sentiment selection in FIG. 4A, with sentiment information, e.g. a sentiment word, of the color, an object matched with the sentiment word is displayed on the display part of the search requestor terminal.

When the red color is input, the color-sentiment information management unit 210 determines the priorities of the orange color and the red color depending on the scores as described above. When the determined priority of the red color is higher than that of the orange color, the color-sentiment information database 232 is searched for a sentiment word related to the red color and the sentiment word is matched with the red color. Next, the object extraction management unit 220 receives from the color-sentiment information management unit 210 information on the sentiment word matched with the red color. Based on the above-described public information on sentiment, with the sentiment word matched with the red color, object information (found from the object information database 234) found with regard to the sentiment word, e.g. the art work "Trail" created by "Cho Sang Geun" is at the top of the list as shown in FIG. 4B, and is provided to the search requestor terminal 100. Referring to FIG. 4B, since the priority of the red color is higher than that of the orange color, the art work "Trail" (referring to the art work 1 in FIG. 4B) related to the red color in terms of sentiment has higher priority than the art work "Soaring" (referring to the art work 2 in FIG. 4B) related to the orange color in terms of sentiment.

Figure 5:
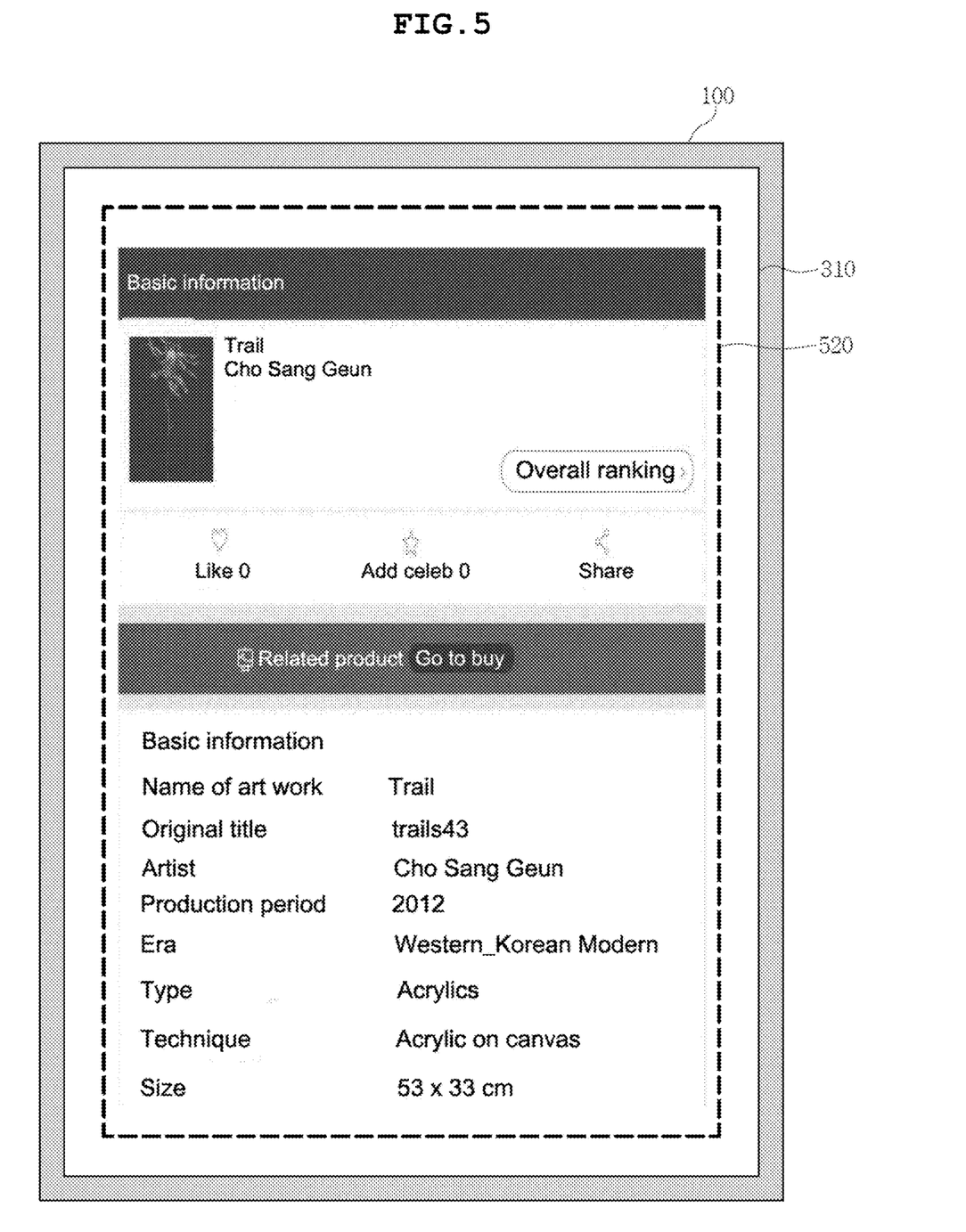
FIG. 5 is a view illustrating an example of a desired object result displayed on a display part of a search requestor terminal according to the present invention.

Among the multiple object search results 340 shown in FIG. 4B, when the search requestor selects a desired object, e.g. the art work 1 "Trail" in FIG. 4B, the object extraction management unit 220 searches the object information database 234 again, and transmits information 520, as shown in FIG. 5, related to the art work "Trail" to the search requestor terminal.

Here, a color-sentiment based search method performed by the system will be described with referent to FIG. 6.

Figure 6:
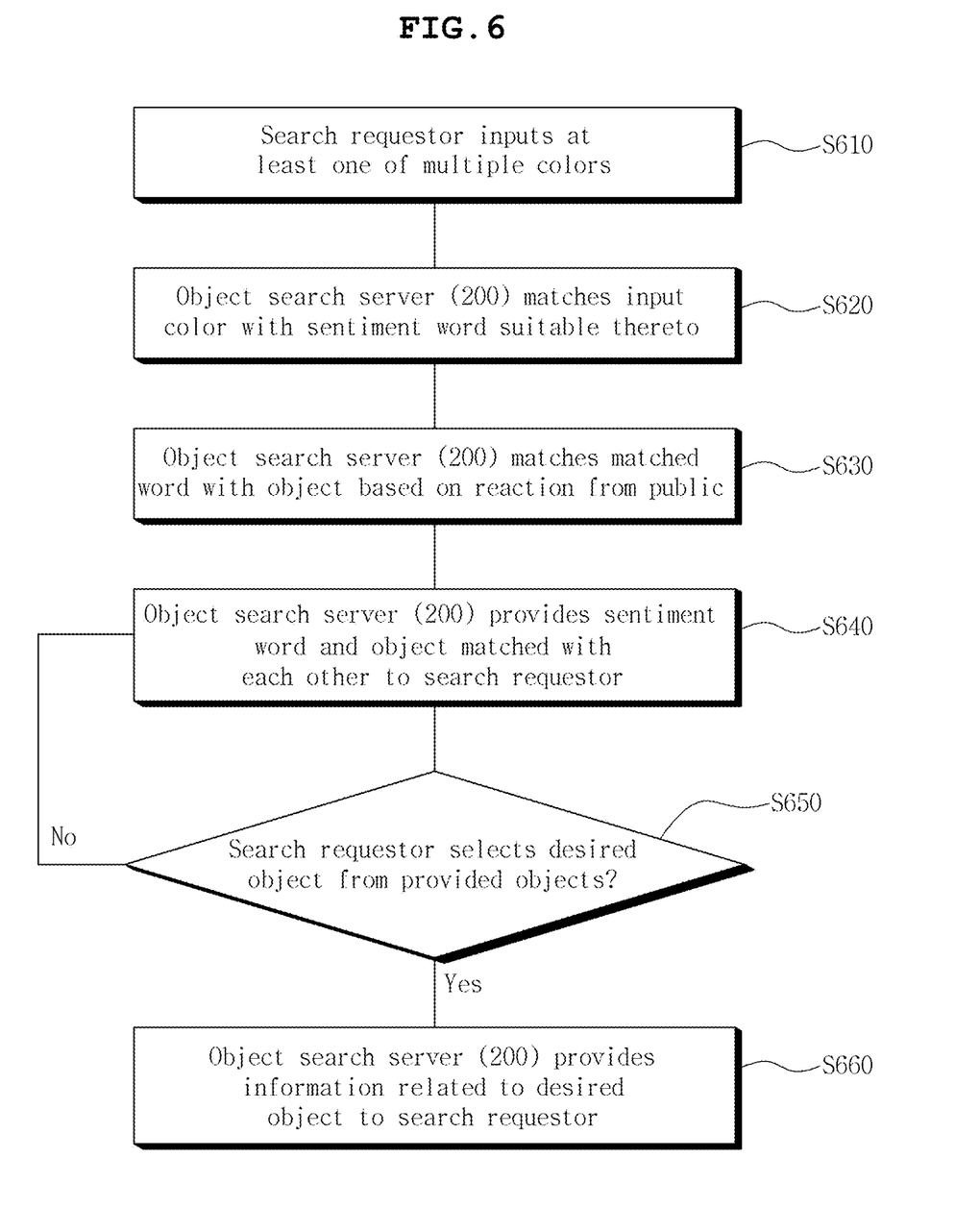
FIG. 6 is a flowchart illustrating a color-sentiment based search method according to the present invention.

First, as shown in FIG. 6, the method includes inputting at least one of multiple colors by the search requestor via the search requestor terminal 100 at step S610. For example, as shown in FIG. 3A, the search requestor selects "the orange color", which is a preferred color, on the display part 310.

Next, at step S620, the color-sentiment information management unit 210 of the object search server 200 capable of communicating with the search requestor terminal 100 searches the color-sentiment information database 232 for the sentiment word suitable to the orange color, and matches the sentiment word with the orange color. For example, the first to third sentiment words, etc. as described above are matched with the orange color.

Next, at step S630, based on sentiment reaction published on the Internet from people who have viewed the object and have impressions, e.g., the sentiment words in comments on SNS, the object extraction management unit 220 matches the sentiment information, such as the first to third sentiment words, etc., received from the color-sentiment information management unit 210 with the object information stored in the object information database.

Next, at step S640, the object extraction management unit 220 transmits the sentiment information and the object information matched with each other to the search requestor terminal. For example, the object extraction management unit 220 lists the sentiment words and the art works correspondingly matched with each other in the form of a list, and provides the art work list to the search requestor terminal 100.

At step S650, when the search requestor selects a desired object from objects displayed on the search requestor terminal 100, step S660 of the method is performed. When the search requestor does not select a desired object, step S640 is performed.

At step S660, the object extraction management unit 220 of the object search server 200 further searches the object information database 234, and transmits information related to the object selected by the search requestor to the search requestor terminal 100.

Although embodiments of the present invention have been described in detail for illustrative purposes, the scope of the present invention is not limited to the embodiments and changes and modifications from the spirit of the present invention defined in the following claims by those skilled in the art are also included in the scope of the present invention.

Simple changes and modifications of the present invention are appreciated as included in the scope and spirit of the invention, and the protection scope of the present invention will be defined by the accompanying claims.

What is claimed is:

1. An object search server for searching for an object based on a color-sentiment, the server comprising:
    an object search information database including a color-sentiment information database for storing at least one piece of sentiment information capable of being matched with a color and an object information database for storing information related to the object, wherein the object information database stores the sentiment information matched with the color;
    a color-sentiment information management unit being configured to match at least one color received from a search requestor terminal with the sentiment information stored in the color-sentiment information database and assign scores to the sentiment information and the color for each sentiment and for each color, respectively, wherein the at least one color is one of multiple colors input to the search requestor terminal; and
    an object-sentiment information management unit for matching, based on public information, which is published on the Internet, on a sentiment that people have after viewing the object, object information stored in the object information database with the sentiment information managed by the color-sentiment information management unit, and providing the sentiment information and the object information matched with each other to the search requestor terminal,
    wherein the sentiment information and the object information matched with each other are listed in order according to a combination of a score of the sentiment information for each sentiment and a score of the color for each color.

2. The object search server of claim 1, wherein the object sentiment information management unit is configured to update the public information on the sentiment in real time, or periodically.

3. The object search server of claim 1, wherein the sentiment information includes at least one of an expression, a sentiment word, a gesture, a sound, and an emoticon.

4. The object search server of claim 1, wherein among the multiple object search results transmitted to the search requestor terminal, when a desired object is received from the search requestor terminal, the object-sentiment information management unit searches the object information database and transmits information related to the desired object to the search requestor terminal.

5. The object search server of claim 4, wherein the information related to the desired object includes at least one of an image of the object, a title or name of the object, an original title, a maker, a production period, an era, a type, a technique, a size, and a possessive place.

6. An object search method of searching for an object based on a color-sentiment by an object search server, the method comprising:
(a) receiving, from a search requestor terminal, at least one color of multiple colors input to the search requestor terminal;
(b) matching the received color with sentiment information of an object search information database and assigning scores to the sentiment information and the color for each sentiment and for each color, respectively by a color-sentiment information management unit included in the object search server;
(c) matching, by an object-sentiment information management unit included in the object search server, based on public information, which is published on the Internet, on a sentiment that people have after viewing an object, the sentiment information with object information in the object search information database;
(d) transmitting, to the search requestor terminal, multiple object search results based on an object search information database storing sentiment information matched with the color of step (a);
(e) receiving, from the search requestor terminal, a desired object among multiple object search results transmitted to the search requestor terminal; and
(f) searching the object search information database, and transmitting information related to the desired object to the search requestor terminal,
wherein the sentiment information and the object information matched with each other are listed in order according to a combination of a score of the sentiment information for each sentiment and a score of the color for each color.

7. A color-sentiment based search system comprising:
a search requestor terminal configured to input, by a search requestor, at least one color of multiple colors to search for an object, and receive multiple object search results based on sentiment information matched with the color;
an object search server configured to transmit, to the search requestor terminal, the multiple object search results based on an object search information database storing the sentiment information matched with the color; and
a network configured to connect the search requestor terminal and the object search server in a wired or wireless manner,
wherein the object search information database of the object search server includes:
a color-sentiment information database storing at least one piece of sentiment information capable of being matched with the color; and
an object information database storing information related to the object, and
the object search server includes:
a color-sentiment information management unit being configured to match the color with the sentiment information stored in the color-sentiment information database and assign scores to the sentiment information and the color for each sentiment and for each color, respectively; and an object-sentiment information management unit for matching, based on public information, which is published on the Internet, on a sentiment that people have after viewing the object, object information stored in the object information database with the sentiment information managed by the color-sentiment information management unit, and providing the sentiment information and the object information matched with each other to the search requestor terminal,
wherein the sentiment information and the object information matched with each other are listed in order according to a combination of a score of the sentiment information for each sentiment and a score of the color for each color.

8. The color-sentiment based search system of claim 7, wherein among the multiple object search results transmitted to the search requestor terminal, when the search requestor inputs a desired object, the object search server searches the object search information database and transmits information related to the desired object input by the search requestor to the search requestor terminal.

9. A color-sentiment based search method conducted by a color-sentiment based search system including: a search requestor terminal; an object search server having an object search information database; and a network connecting the search requestor terminal and the object search server in a communication manner,
the method comprising:
(a) inputting, by a search requestor, at least one color of multiple colors via the search requestor terminal;
(b) matching, the input color with sentiment information in the object search information database and assigning scores to the sentiment information and the color for each sentiment and for each color, respectively by a color-sentiment information management unit included in the object search server;
(c) matching, by an object-sentiment information management unit included in the object search server, based on public information, which is published on the Internet, on a sentiment that people have after viewing an object, the sentiment information with object information in the object search information database; and
(d) transmitting, by the object search server, the sentiment information and the object information matched with each other to the search requestor terminal,
wherein the sentiment information and the object information matched with each other are listed in order according to a combination of a score of the sentiment information for each sentiment and a score of the color for each color.

10. The color-sentiment based search method of claim 9, further comprising:
inputting, by the search requestor, a desired object of the object information transmitted to the search requestor terminal; and
searching, by the object search server, the object search information database and transmitting information related to the desired object input by the search requestor to the search requestor terminal.

* * * * *